United States Patent [19]

Dupin

[11] Patent Number: 4,529,718
[45] Date of Patent: Jul. 16, 1985

[54] ALUMINA COATING COMPOSITIONS FOR CATALYST SUPPORTS AND PROCESS FOR THEIR FORMULATION

[75] Inventor: Thierry Dupin, Garges/les/Gonesse, France

[73] Assignee: Rhone-Poulenc Specialites Chimiques, Courbevoie, France

[21] Appl. No.: 619,324

[22] Filed: Jun. 11, 1984

Related U.S. Application Data

[63] Continuation of Ser. No. 409,436, Aug. 19, 1982, abandoned.

[30] Foreign Application Priority Data

Aug. 27, 1981 [FR] France ............................. 81 16352

[51] Int. Cl.$^3$ ............................................. B01J 21/04
[52] U.S. Cl. .................................... 502/439; 502/263; 502/355; 423/628
[58] Field of Search ...................... 502/263, 355, 439; 423/628

[56] References Cited

U.S. PATENT DOCUMENTS 3,554,929  1/1971  Aarons ........................... 502/304 X
3,928,239  12/1975 Yonehara et al. ................. 502/333
4,199,477  4/1980  Hegedus ......................... 502/439 X Primary Examiner—W. J. Shine
Attorney, Agent, or Firm—Burns, Doane, Swecker & Mathis

[57] ABSTRACT

Aqueous alumina coating compositions well adopted for directly impregnating/coating both ceramic and metallic catalyst supports to provide integral, both macroporous and microporous coatings therefor, which coated supports are useful for the fabrication of a wide variety of catalysts for catalyzing a broad spectrum of reactions, including those characterized by highly limited internal diffusion or by progressive catalyst poisoning, e.g., the treatment of exhaust gases, are comprised of water and a particulate alumina binder fraction dispersed therein, and an undispersed particulate alumina filler fraction therefor, said particulate alumina fractions being from 10 to 60% dispersed in the water, with the grain size distribution of the alumina particles comprising said undispersed filler fraction being such that the average diameter of said alumina filler particles ranges from 1 to 15 microns, and with at least 70% of such alumina filler particles having diameters ranging from one-half of the average diameter to twice the average diameter.

21 Claims, No Drawings

ALUMINA COATING COMPOSITIONS FOR CATALYST SUPPORTS AND PROCESS FOR THEIR FORMULATION

This application is a continuation of application Ser. No. 409,436, filed Aug. 19, 1982, now abandoned.

BACKGROUND OF THE INVENTION

1. Field of the Invention

The present invention relates to alumina compositions for coating catalyst supports, to process for the preparation thereof and to the catalyst supports prepared therefrom. The invention more especially relates to alumina compositions for coating metallic or ceramic substrates to fabricate catalyst supports having a surface layer possessing both microporosity and macroporosity.

2. Description of the Prior Art

It is known to this art that catalysts comprised of a substrate coated with a film or layer of refractory oxides upon which a catalytically active phase is deposited, are useful in a wide variety of gaseous phase reactions. Thus, the catalytic purification or conversion of the exhaust gases from gasoline or diesel fueled internal combustion engines is at the present time effected by means of catalysts comprising a ceramic or metallic substrate in the form of an inert and rigid (monolithic) structure in a honeycomb configuration, coated with a film or layer of alumina, and onto which the active catalyst phase is deposited/coated.

The coating of ceramic monoliths with a film of refractory oxides, and in particular of alumina, is relatively easy, but the coating of metallic monoliths is much more difficult and requires, for example, the use of surface-oxidized steels containing aluminum, such that the refractory oxide or alumina layer may subsequently be more effectively attached.

Heretofore, there existed no composition that could be indiscriminantly coated onto both ceramic and metallic substrates without the necessity for a preliminary treatment of such substrates and which would provide an excellent bond between the ceramic or metallic substrate and the film or layer of the refractory oxide coating.

Alumina compositions for the coating of catalyst supports too are known to this art; compare U.S. Pat. No. 3,554,929. The alumina compositions described in this patent contain 5 to 10% colloidal boehmite and 90 to 95% of activated alumina particles having a specific surface area of 0 to 600 m²/g and a particle size between 8 and 60 microns. According to Example 1 of the patent, it is necessary, in order to coat an aluminum shaped body (Alloy 5052 containing 2.5% magnesium) with the alumina composition described, to initially coat the shaped body with a layer containing principally mullite, a high proportion of crystalline alumina and a small amount of amorphous material.

Also according to the aforesaid '929 patent, the alumina compositions with large specific surface areas claimed therein cannot be used to directly coat metallic surfaces without a preliminary treatment. Furthermore, the alumina coatings with large specific surface areas obtained according to this patent do not have satisfactory porosity properties; in fact, the coatings obtained are microporous and do not have the macroporosity required for good catalytic effectiveness.

SUMMARY OF THE INVENTION

Accordingly, a major object of the present invention is the provision of improved alumina compositions for the coating of catalyst supports, which improved compositions can be directly applied to both metallic or ceramic substrate surfaces and which enable the fabrication of catalyst supports having both microporosity and macroporosity; the product supports are eminently suitable for the preparation of catalysts useful for catalyzing very rapid reactions characterized by highly limited internal diffusion and for catalyzing reactions entailing progressive catalyst poisoning, such as, for example, the treatment of the exhaust gases emanating from various internal combustion engines.

Briefly, the present invention features aqueous alumina compositions for the coating of catalyst supports, comprising a binder which essentially constitutes a dispersed phase and a filler essentially constituting the undispersed or matrix phase of the composition, and characterized in that the degree of dispersion in water of the subject compositions ranges from 10 to 60%, the grain size distribution of the undispersed phase of the subject compositions is such that the average diameter of the alumina particles comprising same ranges from 1 to 15 microns, with at least 70% of said particles having a diameter ranging from one-half of the average diameter to twice the average diameter.

DETAILED DESCRIPTION OF THE INVENTION

More particularly according to this invention, by "degree of dispersion" as utilized herein, there is intended the amount of alumina remaining in total colloidal suspension after the composition has been subjected to centrifugation. This amount of dispersion is measured in the following manner: the aqueous alumina composition is diluted such as to provide a total alumina composition equal to 100 g/l; 100 cm³ of this solution is subjected to violent agitation for 10 minutes; the solution is subsequently centrifuged for 10 minutes at a velocity of 3000 rpm; the decanted fraction is then separated from the fraction which has not been decanted, which consists of a colloidal suspension of alumina; the decanted fraction is calcined and weighed, with the amount of dispersion being expressed as the ratio of the total initial amount of the alumina decanted to the total initial amount of alumina in the composition.

According to the present invention, the amount of dispersion in water of the aqueous alumina composition ranges from 10 to 60% and preferably from 10 to 40%, the grain size distribution of the undispersed fraction of the composition is such that the average grain size of the alumina particles constituting same ranges from 1 to 15 microns, with at least 70% of such particles having a diameter ranging from one-half of the average diameter to twice the average diameter.

The undispersed fraction of the subject compositions essentially consists of the filler, while a minor portion thereof may originate from the binder.

The proportion by weight of the dispersible fraction of the compositions according hereto ranges from 10 to 60% and preferably from 10 to 40% by weight. Consequently, the proportion by weight of the undispersible fraction of the subject compositions ranges from 40 to 90% and preferably from 60 to 90% by weight.

Also according to the present invention, the alumina binder essentially consists of a fraction of the dispersed alumina and possibly of a minor amount of the undispersed alumina, with the dispersed fraction comprising at least 70% by weight of the binder.

The alumina binder employed must be gellable or coagulable under thermal or chemical action.

Gelatification or coagulation by thermal effects is well known to those skilled in the art and may be carried out by evaporation of the water of aqueous suspension or dispersion of the alumina constituting the binder. Gelatification or coagulation by chemical action is also well known to those skilled in the art and may be carried out by increasing the pH of the suspension or dispersion in water of the alumina constituting the binder to a value greater than 9, which corresponds to the isoelectric point of alumina.

The alumina binders suitable for use according to the invention are in particular aqueous suspensions or dispersions of fine or ultrafine boehmites consisting of particles having dimensions in the colloidal region, i.e., less than approximately 2000 Å.

The aqueous dispersions or suspensions of fine or ultrafine boehmites may be obtained, as is also well known to this art, by the peptization in water or acidified water of these materials. The fine or ultrafine boehmites employed according to the present invention may be specifically obtained by the process described in French Pat. Nos. 1,261,182 and 1,381,282 or in published European Patent Application No. 15,196, assigned to the assignee hereof.

French Pat. No. 1,261,182 specifically describes a process for the preparation of fine or ultrafine boehmites by heating an aqueous dispersion of alumina in the presence of a monovalent acid radical, the aqueous alumina dispersion having been obtained from basic aluminum chloride, basic aluminum nitrate, aluminum hydroxide, alumina gel or colloidal solutions of alumina. This product, marketed by the E. I. du Pont de Nemours & Company under the trademark of "Baymal", is a fine or ultrafine fibrillar boehmite, having a specific surface area typically ranging from 250 to 350 $m^2/g$.

French Pat. No. 1,381,282 describes, in particular, a process for the preparation of fine or ultrafine boehmite consisting of developing, at a temperature ranging from 60° to 150° C., a suspension or a cake of an amorphous, hydrated alumina gel containing up to 35% by weight of alumina, calculated as $Al_2O_3$, and with respect to this alumina, calculated as $Al_2O_3$, a quantity of monovalent acid ions varying from 0.05 to 0.5, for a period of time ranging from 15 hours to 10 days; the cake having been obtained via the draining, washing and filtering of an alumina gel continuously precipitated at a pH of from 8 to 9 from a solution of sodium aluminate and nitric acid. The specific surface area of these materials typically ranges from 200 to 600 $m^3/g$.

European Patent Application No. 15,196 specifically describes a process for the preparation of boehmite, at least partially in the form of ultrafine boehmite, by the treatment in an aqueous medium having a pH of less than 9, of an activated alumina powder obtained via the rapid dehydration of hydrargillite in a stream of hot gases.

Aqueous suspensions or dispersions obtained from pseudo-boehmite, amorphous aluminum hydroxide gels or ultrafine hydrargillite, may also be employed as alumina binders.

The pseudo-boehmite may be specifically prepared by the process described in U.S. Pat. No. 3,630,670 by the reaction of a solution of an alkaline aluminate with a solution of a mineral acid. It may also be prepared in the manner described in French Pat. No. 1,357,830 by precipitation at pH 9, at a temperature slightly higher than ambient, from the reagents in a concentration such that approximately 50 g/l alumina is obtained in the dispersion.

The amorphous alumina gels may be specifically prepared by the processes described in the article "Alcoa Paper No. 19, pp. 9–12 (1972)" and particularly by the reaction of aluminate and acid, or of a salt of aluminum or by the hydrolysis of aluminum alcoholates, or by the hydrolysis of basic aluminum salts.

The gels of aluminum hydroxide are advantageously those prepared as described in U.S. Pat. Nos. 3,268,295 and 3,245,919.

The ultrafine hydrargillite may be prepared, in particular, by the process described in French Pat. No. 1,371,808, by evolution, at a temperature ranging from ambient to 60° C., from alumina gels in the form of cakes and containing, with respect to the alumina calculated as $Al_2O_3$, 0.10 monovalent acid ions.

According to one embodiment of the invention, the alumina binder may be replaced at least in part by a suspension or dispersion of silica having the same properties as the alumina binder.

According to the present invention, the alumina filler consists essentially of an undispersible alumina fraction and possibly a minor amount of dispersible alumina which is dispersed in the composition, with the undispersible fraction constituting at least 90% by weight of the filler. Also consistent herewith, the grain size distribution of the undispersed fraction of the composition, which thus essentially constitutes the filler, is such that the average diameter of the alumina particles conprising same ranges from 1 to 15 microns, with at least 70% of the particles having a diameter ranging from one-half of the average diameter to twice said average diameter.

The alumina filler employed may entirely consist of alumina having the aforenoted characteristics. In particular, hydrated alumina compounds may be used, such as hydrargillite, bayerite, boehmite, pseudo-boehmite and amorphous or essentially amorphous alumina gels. It is also possible to use the dehydrated or partially dehydrated forms of these compounds, which consist of transition aluminas and which contain at least one of the phases of the groups rho, chi, eta, gamma, kappa, theta, delta and alpha.

In particular, alumina fillers obtained by one of the following processes may be used, optionally after the grinding and screening of the particles thereof:

(i) An aqueous solution of an aluminum salt is precipitated by a solution of an alkaline aluminate, the precipitate obtained is atomized and then placed in suspension in an aqueous solution having a pH ranging from 4.5 to 7, the alumina slurry obtained is atomized and dried, then washed, dried and calcined (the process described in U.S. Pat. No. 3,520,654);

(ii) By the precipitation of an alumina gel at a pH ranging from 7.5 to 11, washing, drying, placing into suspension, and the rapid dehydration of the product in a stream of hot gases having an inlet temperature ranging from about 350° to 1000° C., followed by calcination (process described in French Pat. No. 2,221,405);

(iii) By precipitating an alumina gel at a pH ranging from 7 to 10.5, aging the precipitate at a pH ranging from 10 to 11, and homogenizing and atomizing at 250°–550° C. the slurry which results, followed by calcination (process described in British Patent Specification No. 888,772);

(iv) Precipitating an alkaline aluminate with a mineral acid at a temperature ranging from 30° to 75° C., aging in a second reactor at a temperature of from 35° to 70° C. and at a pH of about 7, recycling the slurry obtained in the mixing reactor, and filtering, washing and drying the product by atomization, followed by calcination (process described in U.S. Pat. No. 3,630,670);

(v) By the rapid dehydration of aluminum hydroxides or oxyhydroxides, and more particularly of hydrargillite, in a stream of hot gases, such dehydration being effected in any suitable apparatus by means of the stream of hot gases, with the temperature of the gases at the inlet of the apparatus typically varying from about 400° to 1200° C. and the contact time of the hydroxide or the oxyhydroxide with said hot gases typically ranging from a fraction of a second to 4–5 seconds; such a process for the preparation of an activated alumina powder is featured in French Pat. No. 1,108,011; and (vi) By treating, in an aqueous medium having a pH of less than 9, an activated alumina powder obtained by the rapid dehydration of hydrargillite in a stream of hot gases, drying by atomization, followed by calcination (process described in European Patent Application No. 15,196).

The alumina fillers obtained via the aforesaid various processes may be classified into two groups. The first group is comprised of the fillers obtained after drying and possible calcination and displaying the degree of dispersion required. These materials may be used as such, or after grinding and screening. The second group comprises those fillers obtained after drying, which do not display the degree of dispersion required. These charges require, to be functional, a calcination stage at a temperature in excess of 300° C.; they may then be used consistent herewith, possibly after grinding and screening.

According to another embodiment of the invention, the alumina filler may be replaced at least in part by an oxide selected from among the oxides of magnesium, calcium, strontium, barium, scandium, yttrium, lanthanides, gallium, indium, thallium, silicon, titanium, zirconium, hafnium, thorium, germanium, tin, lead, vanadium, niobium, tantalum, chromium, molybdenum, tungsten, rhenium, iron, cobalt, nickel, copper, zinc and bismuth.

The present invention also relates to the preparation of the aforenoted compositions for the coating of catalyst supports.

In a first embodiment for the preparation of the compositions according to this invention, the mixture of the filler and the binder may be effected in the form of powders. The binder in the form of powder may consist of different products: boehmites, pseudo-boehmite, amorphous alumina gels, aluminum hydroxide gels, non-peptized ultrafine hydrargillite. This powderous admixture is then contacted with water or acidified water. The mixture of the filler, the binder and water is carried out such that the pH of the final composition is less than 4 and in such proportions that the amount of dispersion characterizing the final composition ranges from 10 to 60%.

According to a second embodiment of the process for the preparation of the composition according to the invention, the filler, in the form of a powder, and the binder, in the form of a suspension or a dispersion of alumina, are mixed together in proportions such that the amount of dispersion characterizing the composition ranges from 10 to 60% and the pH of the final composition is less than 4.

Regardless of the particular process for the preparation of the composition according to the invention, the latter must have, in order to be applied as a coating to a catalyst support, a viscosity ranging from 10 to 800 centipoises. Such viscosity values may be obtained specifically by maintaining the total concentration of alumina in the composition within the limits of 10 to 40% by weight or by adding to the composition any suitable organic thickeners, such as hydrophilic polymers, for example, carboxymethylcellulose, carboxyethylcellulose, xanthane gums, polyvinyl alcohol, polyacrylates, and the like; such organic thickeners, in particular, must be compatible with the medium of the composition and the storage time therefor, prior to application as a coating to a catalyst support.

The present invention also relates to the coatings utilizing the compositions of the invention, having both microporosity and macroporosity.

The compositions according to this invention are directly applied as coatings to catalyst supports, comprising either a ceramic or a metallic substrate. This constitutes an especially desirable feature provided by the compositions of the invention, i.e., the coating of catalyst supports. When the compositions of the invention are applied as coatings to metallic substrates, it is advantageous that the latter be clean, for this reason, it may be advantageous to degrease same prior to coating or to subject them to pickling in an acid medium (for example, chlorosulfuric acid).

The coating of a given substrate with the composition of the invention may be effected in the following manner:

(i) the ceramic or metallic substrate is immersed in the composition of the invention, such as to fill all of the channels and voids in the substrate, or the composition may be caused to flow through the channels and voids of the substrate;

(ii) a partial drainage is effected, followed by the complete draining of the channels of the substrate, by means, for example, of a stream of compressed air;

(iii) the composition is coagulated by thermal or chemical action; and (iv) the coating is dried, if necessary, at a temperature less than 300° C., followed by the calcination of the coated substrate at a temperature ranging from 300° C. to 1100° C., the temperature of calcination being a function of the specific surface area for the resultant coating.

The thickness of the coatings deposited utilizing the compositions of the invention having the aforesaid viscosity values, ranges from about 2 microns to 100 microns. For a given composition, there exists a quasi-linear relationship between the thickness of the coating deposited and the viscosity of the composition employed.

In order to increase the thickness of the layer obtained in a coating operation, a second, and then a third, and so forth, coating may be effected after calcination.

The catalyst supports obtained by the coating of a metallic or ceramic substrate with the compositions of the invention, and displaying both microporosity and macroporosity, are characterized in that the distribution of the pores of the coatings are such that 0.05 to 0.50 cm$^3$/g of the pore volume consists of pores having a diameter ranging from 0.1 to 0.5 micron, 0 to 0.40 cm$^3$/g of the pore volume consists of pores having a diameter ranging from 0.5 to 1 micron and 0 to 0.40 cm$^3$/g of the pore volume consists of pores having a diameter ranging from 1 to 20 microns, and 0.3 to 0.9 cm$^3$/g of the pore volume consists of pores having a diameter less than 0.1 micron.

The specific surface area of the coatings ranges from 20 to 350 m$^2$/g.

The total pore volume of the coatings ranges from 0.35 cm$^3$/g to 2.2 cm$^3$/g and preferably from 0.5 to 1.5 cm$^3$/g.

The final product catalyst supports may be treated, if the conditions of application so require, such as to thermally stabilize their alumina surface layer. Furthermore, as is known to those skilled in this art, this treatment may be effected using silica, alkaline earth metals or rare earths.

The final product supports are perfectly suited for the preparation of catalysts for very rapid reactions characterized by highly limited internal diffusion and for reactions entailing progressive catalyst poisoning, such as, for example, the treatment of the exhaust gases emanating from internal combustion engines; for all of the processes for the hydro-treatment of petroleum products, such as hydrodesulfurization, hydrodemetallization, hydrodenitrification. They are also useful in reactions for the recovery of sulfur from sulfur compounds (Claus catalyst), dehydration, reforming, steam reforming, dehydrohalogenation, the dehydrocyclization of hydrocarbons or other organic compounds, hydrocracking, hydrogenation, dehydrogenation, oxidation and reduction reactions.

In order to further illustrate the present invention and the advantages thereof, the following specific examples are given, it being understood that same are intended only as illustrative and in nowise limitative.

EXAMPLE 1

(i) Preparation of a composition according to the invention

An alumina binder (I) was prepared in the following manner:

5000 g alumina obtained by the dehydration of hydrargillite in a stream of hot gases at 800° C., for 0.5 seconds, were introduced into an autoclave containing a nitric acid solution at pH=1. The suspension was heated under agitation for 4 hours at 180° C. The suspension obtained, constituting the alumina binder (I), was dried by atomization at 150° C. to convert it into a powder; X-ray analysis evidenced the powder to have a fibrillary boehmite structure.

A fraction of this powder was calcined in air at 600° C. for 2 hours to obtain the alumina filler (II).

The binder and the filler were dispersible as follows:

TABLE I

| | Extent of Dispersion |
|---|---|
| Alumina binder (I) | 75% |
| Alumina filler (II) | 5% |

150 g of the alumina binder (I) were dispersed in the form of a powder in 1000 cm$^3$ of distilled water, agitated for 10 minutes, and then 300 g of the alumina filler (II) were added, followed by agitation for 10 minutes.

The extent of dispersion of the resultant composition was 25% and its viscosity was 70 centipoises; the grain size distribution of the undispersed fraction was such that the average diameter of the particles of such fraction was 7.2 microns, with 81% of the particles having a diameter ranging from one-half of the average diameter to twice the average diameter.

(ii) Catalyst support prepared by coating a ceramic monolith with said composition (i)

A cordierite monolith having 400 openings per square inch was used.

The monolith was completely immersed in the composition (i) until the channels were completely filled, then decanted and drained in a stream of air flowing at a rate of 300 1/h. After drying at 110° C., the monolith was calcined at 600° C.

The characteristics of the product coating were the following:

(1) Thickness=43 microns
(2) Specific surface=192 m$^2$g$^{-1}$

TABLE II

| Pore Volume in g/cm$^3$ consisting of pores having diameters $\emptyset$ in $\mu$m such that: | | | | |
|---|---|---|---|---|
| Total pore volume g/cm$^3$ | $\emptyset < 0.1$ | $0.1 < \emptyset < 0.5$ | $0.5 < \emptyset < 1$ | $1 < \emptyset < 20$ |
| 1.5 | 0.71 | 0.11 | 0.05 | 0.28 |

EXAMPLE 2

(i) Preparation of a composition according to the invention

As the binder, the alumina binder (I) of Example 1 was used, and as the filler, the alumina (II) of Example 1.

120 g of the alumina binder (I) were mixed in the form of a powder with 330 g of the alumina filler (II).

This mixture was introduced under agitation into 1200 g distilled water and the pH was adjusted to 3.5 with nitric acid.

The extent of dispersion of the resultant composition was 19% and its viscosity was 55 centipoises, the grain size distribution of the undispersed fraction was such that the average diameter of the particles of such fraction was 7.5 micron, with 78% of the particles having a diameter ranging from one-half of the average diameter to twice the average diameter.

(ii) Catalyst support prepared by coating a metallic monolith with said composition (i)

A metallic monolith of common stainless steel was used; it had 600 openings per square inch, and it was subjected to the same treatment as in Example 1, with the composition defined therein.

The characteristics of the product coating were the following:

(1) Thickness=35 microns
(2) Specific surface=185 m$^2$g$^{-1}$

TABLE III

| Pore Volume in g/cm$^3$ consisting of pores having a diameter $\emptyset$ in $\mu$m such that: | | | | |
|---|---|---|---|---|
| Total pore volume g/cm$^3$ | $\emptyset < 0.1$ | $0.1 < \emptyset < 0.5$ | $0.5 < \emptyset < 1$ | $1 < \emptyset < 20$ |
| 1.25 | 0.72 | 0.15 | 0.07 | 0.31 |

EXAMPLE 3

(i) Preparation of a composition according to the invention

An alumina binder (III) was prepared in the following manner:

A sodium aluminate solution was continuously precipitated with nitric acid at pH 8.7; after aging for 8 hours the precipitate was drained, washed and placed into suspension in an autoclave where it was maintained under agitation at 110° C. for 24 hours. The resultant suspension, which constituted the alumina buffer (III) was then dried by atomization at 110° C. to convert same into the form of powder. The powder had an ultrafine fibrillary boehmite structure, determined by X-ray analysis; its extent of dispersion in water was 90%.

40 g of the alumina binder (III) were dispersed in the form of powder in 1200 cm³ distilled water having a pH 2.5 adjusted with nitric acid, and 310 g of the alumina filler (II) were added under agitation, together with 16 g of lanthanum nitrate, in order to thermally stabilize the coating. The composition obtained had the following characteristics:

(1) Extent of dispersion: 12%
(2) Viscosity: 110 centipoises
(3) The grain size distribution of the undispersed fraction was such that the average diameter of the particles of such fraction was 8.1 microns, with 75% of the particles having a diameter ranging from one-half of the average diameter to twice the average diameter.

(ii) Catalyst support prepared by coating a ceramic monolith with the composition (i)

A cordierite monolith was used and the same procedure as in Example 1 was followed, utilizing the aforesaid composition (i).

The characteristics of the product coating were the following:

(1) Thickness = 63 microns
(2) Specific surface = 210 m²g⁻¹

TABLE IV

| Total pore volume g/cm³ | Pore Volume in g/cm³ consisting of pores having a diameter ∅ in μm such that: | | | |
|---|---|---|---|---|
| | ∅ < 0.1 | 0.1 < ∅ < 0.5 | 0.5 < ∅ < 1 | 1 < ∅ < 20 |
| 1.33 | 0.81 | 0.16 | 0.06 | 0.30 |

EXAMPLE 4

(i) Preparation of a composition according to the invention

The alumina filler (II) was reground to provide a powder, the average diameter of the particles of which being less than 3 microns, and was then processed to eliminate the excessively fine or coarse particles. The grain size distribution was then as follows:

The average diameter of the particles was 2.6 microns and 83% of the particles had diameters ranging from one-half of the average diameter to twice the average diameter.

210 g of the ground alumina filler (II) and 45 g of the powdered alumina binder (III) were dispersed in 1200 cm³ water, and the final pH thereof was adjusted to 3.7 by the addition of nitric acid thereto.

The resultant composition had the following characteristics:

(1) Extent of dispersion: 16%
(2) Viscosity: 40 centipoises
(3) The grain size distribution of the undispersed fraction was such that the average diameter of the particles of such fraction was 2.5 microns, with 84% of the particles having diameters ranging from one-half of the average diameter to twice the average diameter.

(ii) Catalyst support prepared by coating a metallic monolith with the composition (i)

The composition (i) was employed to coat a metallic monolith of standard stainless steel, by following the procedure described in Example 1, utilizing the aforesaid composition (i).

The product coating had the following characteristics:

(1) Thickness: 13 microns
(2) Specific surface: 201 m²g⁻¹

TABLE V

| Total pore volume g/cm³ | Pore volume in g/cm³ consisting of pores having a diameter ∅ in μm such that: | | | |
|---|---|---|---|---|
| | ∅ < 0.1 | 0.1 < ∅ < 0.5 | 0.5 < ∅ < 1 | 1 < ∅ < 20 |
| 1.27 | 0.76 | 0.13 | 0.06 | 0.32 |

EXAMPLE 5

(i) Preparation of a composition according to the invention

An alumina filler (IV) was prepared in the following manner:

5 kg alumina obtained by the dehydration of hydrargillite in a stream of hot gases at 800° C. for 5 seconds, were ground for one hour in a ball mill, then separated in a blade mill, and finely calcined at 500° C. for one hour.

The characteristics of the resultant alumina filler (V) were the following:

(1) Extent of dispersion: 5%
(2) Specific surface: 295 m²g⁻¹
(3) Grain size distribution: the average diameter of the particles was 12 microns and 71% of the particles had diameters ranging from one-half of the average diameter to twice the average diameter.

285 g of the alumina filler (IV) and of the powdered alumina binder (I) were dispersed in 1200 cm³ water.

The resultant composition had the following characteristics:

(1) Extent of dispersion: 35%
(2) Viscosity: 95 centipoises
(3) The grain size distribution of the undispersed fraction was such that the average diameter of the particles of such fraction was 13.2 microns, with 78% of the particles having diameters ranging from one-half of the average diameter to twice the average diameter.

(ii) Catalyst support prepared by coating a ceramic monolith with the composition (i)

The composition (i) was used to coat a cordierite monolith having 300 openings per square inch following the procedure described in Example 1, utilizing the aforesaid composition (i).

The characteristics of the product coating were the following:

(1) Thickness: 70 microns
(2) Specific surface: 245 m$^2$g$^{-1}$

TABLE VI

| Total pore volume g/cm$^3$ | Pore Volume in g/cm$^3$ consisting of pores having a diameter ∅ in μm such that: | | | |
|---|---|---|---|---|
| | ∅ < 0.1 | 0.1 < ∅ < 0.5 | 0.5 < ∅ < 1 | 1 < ∅ < 20 |
| 0.97 | 0.52 | 0.12 | 0.08 | 0.25 |

It will thus be appreciated that the alumina compositions according to the invention are adopted for directly coating both metallic or ceramic monoliths and enable obtainment of a surface layer therefor having both macroporosity and microporosity.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims. What is claimed is:

1. An aqueous alumina coating composition comprising water and a particulate alumina binder fraction dispersed therein, and an undispersed particulate alumina filler fraction therefor, said particulate alumina fractions being from 10 to 60% dispersed in the water, with the grain size distribution of the alumina particles comprising said undispersed filler fraction being such that the average diameter of said alumina filler particles ranges from 1 to 15 microns, and with at least 70% of such alumina filler particles having diameters ranging from one-half of the average diameter to twice the average diameter.

2. The aqueous alumina coating composition as defined by claim 1, said particulate alumina fractions being from 10 to 40% dispersed in the water.

3. The aqueous alumina coating composition as defined by claim 1, said particulate alumina binder fraction comprising a major amount of dispersed alumina particulates and a minor amount of undispersed alumina particulates, said dispersed alumina particulates comprising at least 70% by weight of said binder fraction.

4. The aqueous alumina coating composition as defined by claim 1, said particulate alumina binder fraction comprising fine or ultrafine boehmite, pseudo-boehmite, amorphous alumina gel, aluminum hydroxide gel or ultrafine hydrargillite.

5. The aqueous alumina coating composition as defined by claim 1, said particulate alumina binder fraction comprising a suspension or dispersion of silica particulates.

6. The aqueous alumina coating composition as defined by claim 1, said particulate alumina filler fraction comprising a major amount of undispersed alumina particulates and a minor amount of dispersed alumina particulates, said undispersed alumina particulates comprising at least 90% by weight of said filler fraction.

7. The aqueous alumina coating composition as defined by claim 1, said particulate alumina filler fraction comprising a hydrated alumina compound, or a dehydrated or partially dehydrated such compound.

8. The aqueous alumina coating composition as defined by claim 7, said particulate alumina filler fraction comprising hydrargillite, bayerite, boehmite, pseudo-boehmite, amorphous or essentially amorphous alumina gel, or a transition alumina comprising at least one of the phases rho, chi, eta, gamma, kappa, theta, delta and alpha.

9. The aqueous alumina coating composition as defined by claim 1, said pariculate alumina filler fraction being replaced at least in part by an oxide of magnesium, calcium, strontium, barium, scandium, yttrium, lanthanides, gallium, indium, thallium, silicon, titanium, zirconium, hafnium, thorium, germanium, tin, lead, vanadium, niobium, tantalum, chromium, molybdenum, tungsten, rhenium, iron, cobalt, nickel, copper, zinc or bismuth.

10. The aqueous alumina coating composition as defined by claim 1, having a pH of less than 4 and a viscosity ranging from 10 to 800 centipoises.

11. A process for the formulation of the aqueous alumina coating composition as defined by claim 1, comprising intimately admixing a powder of said alumina binder with a powder of said alumina filler, and contacting said powderous intimate admixture with water or acidified water, said admixing/contacting being such that the pH of the resultant composition is less than 4, that from 10 to 60% of the particulate alumina is dispersed in the water and that said resultant composition has a viscosity ranging from 10 to 800 centipoises.

12. The process as defined by claim 11, wherein said viscosity of from 10 to 800 centipoises is established by adjusting the total amount of particulate alumina in the resultant composition to from 10 to 40% by weight.

13. The process as defined by claim 11, wherein said viscosity of from 10 to 800 centipoises is established by addition of an organic thickener to the composition.

14. A process for impregnating/coating a catalyst support with the aqueous alumina coating composition as defined by claim 1, comprising (i) immersing a porous, ceramic or metallic catalyst support in said coating composition such as to fill the voids thereof with said coating composition, (ii) next partially decanting and then draining excess composition from the voids of said porous support, (iii) thermally or chemically coagulating said coating composition within and coating/impregnating said porous support, and (iv) optionally drying the same, and (iv) thence calcining said coated/impregnated porous support.

15. A process for impregnating/coating a catalyst support with the aqueous alumina coating composition as defined by claim 1, comprising (i) pouring said coating composition into the voids contained in a porous, ceramic or metallic catalyst support, (ii) next partially decanting and then draining excess composition from the voids of said porous support, (iii) thermally or chemically coagulating said coating composition within and coating/impregnating said porous support, and optionally drying the same, and (iv) thence calcining said coated/impregnated porous support.

16. The process as defined by claims 14 or 15, said calcining (iv) being at a temperature ranging from 300° to 1100° C.

17. A porous ceramic or metallic catalyst support comprising an integral, both microporous and macroporous coating of the coagulated and calcined alumina coating composition as defined by claim 1, the distribution of pores in said integral coating being such that from 0.05 to 0.50 cm$^3$/g of the total pore volume thereof have pore diameters ranging from 0.1 to 0.5 microns, that from 0 to 0.40 cm$^3$/g of the total pore volume thereof have pore diameters ranging from 1 to 20 microns, that from 0.3 to 0.9 cm$^3$/g of the total pore volume thereof have pore diameters of less than 0.1 micron, that the specific surface area thereof ranges from 20 to 350 m$^2$/g, and that the total pore volume thereof ranges from 0.35 to 2.2 cm$^3$/g.

18. The catalyst support as defined by claim 17, the total pore volume of said integral coating ranging from 0.5 to 1.5 cm$^3$/g.

19. A catalyst comprising an active catalyst phase and the porous ceramic or metallic catalyst support as defined by claim 17.

20. An intimate admixture comprising a first particulate alumina binder fraction and a second pariculate alumina filler fraction, said particulate alumina fractions being 10 to 60% dispersible in water, with the grain size distribution of the alumina particles comprising said filler fraction being such that the average diameter of said alumina filler particles ranges from 1 to 15 microns, and with at least 70% of such alumina filler particles having diameters ranging from one-half of the average diameter to twice the average diameter.

21. The aqueous alumina coating composition as defined by claim 1, said particulate alumina binder fraction comprising powdered fibrillary boehmite, and the particulate alumina filler fraction comprising calcined such powdered fibrillary boehmite.

* * * * *